(12) United States Patent
Chen et al.

(10) Patent No.: US 10,505,886 B2
(45) Date of Patent: Dec. 10, 2019

(54) METHOD AND SYSTEM OF OPERATING A SOCIAL NETWORKING APPLICATION VIA AN EXTERNAL DEVICE

(71) Applicant: Tencent Technology (Shenzhen) Company Limited, Guangdong Province (CN)

(72) Inventors: Huihui Chen, Guangdong (CN); Jinhai Liu, Guangdong (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 201 days.

(21) Appl. No.: 15/204,855

(22) Filed: Jul. 7, 2016

(65) Prior Publication Data

US 2016/0323234 A1 Nov. 3, 2016

Related U.S. Application Data

(63) Continuation of application No. PCT/CN2014/091169, filed on Nov. 14, 2014.

(30) Foreign Application Priority Data

Apr. 17, 2014 (CN) .......................... 2014 1 0155958

(51) Int. Cl.
*H04L 12/58* (2006.01)
*H04M 1/725* (2006.01)
(Continued)

(52) U.S. Cl.
CPC ............ *H04L 51/32* (2013.01); *H04M 3/533* (2013.01); *H04W 4/12* (2013.01); *H04W 4/21* (2018.02)

(58) Field of Classification Search
CPC .......... H04L 51/32; H04W 4/21; H04W 4/12; H04M 3/533
(Continued)

(56) References Cited

U.S. PATENT DOCUMENTS 7,072,596 B2* 7/2006 Smith ................ G03G 15/6508
347/264
8,594,745 B1* 11/2013 Zheng ................ H04M 1/6091
370/409
(Continued)

FOREIGN PATENT DOCUMENTS

CN 1933350 A 3/2007
CN 101025806 A 8/2007
(Continued)

OTHER PUBLICATIONS

International Search Report for Application No. PCT/CN2014/091169, dated Feb. 15, 2015, 3 pages.
(Continued)

*Primary Examiner* — Kevin T Bates
*Assistant Examiner* — Golam Mahmud
(74) *Attorney, Agent, or Firm* — Morgan, Lewis & Bockius LLP

(57) ABSTRACT

A method of operating a social networking application via an external device includes at an external device having one or more processors and memory storing programs executed by the one or more processors, receiving one or more new message notifications of a social networking application from a social networking terminal; acquiring a playback instruction from a user to play a new message of the social networking application on the external device; transmitting the playback instruction to the social networking terminal; receiving a first voice message corresponding to the new message of the social networking application from the social
(Continued)

networking terminal; and playing the first voice message on the external device.

7 Claims, 8 Drawing Sheets

(51) Int. Cl.
  *H04W 4/21* (2018.01)
  *H04W 4/12* (2009.01)
  *H04M 3/533* (2006.01)
(58) Field of Classification Search
  USPC .......................................................... 709/206
  See application file for complete search history.

(56) References Cited

U.S. PATENT DOCUMENTS

| | | | | |
|---|---|---|---|---|
| 9,178,845 B2* | 11/2015 | Li | ............................. | H04L 51/38 |
| 9,179,270 B2* | 11/2015 | Liu | ........................ | H04W 4/10 |
| 9,219,796 B2* | 12/2015 | Shin | ...................... | H04L 67/325 |
| 9,237,460 B2* | 1/2016 | Ye | ........................ | H04L 47/2475 |
| 9,262,524 B2* | 2/2016 | Lv | ............................. | H04L 51/20 |
| 9,374,687 B2* | 6/2016 | Chen | ........................ | H04W 4/12 |
| 9,467,403 B2* | 10/2016 | Chen | ........................ | H04L 51/04 |
| 9,648,157 B2* | 5/2017 | Kwon | ............... | H04M 1/72577 |
| 9,900,415 B2* | 2/2018 | Kim | ........................ | H04W 4/21 |
| 2002/0038259 A1* | 3/2002 | Bergman | ............... | G06Q 20/04 705/27.1 |
| 2012/0185547 A1* | 7/2012 | Hugg | ...................... | H04L 51/20 709/206 |
| 2013/0040610 A1* | 2/2013 | Migicovsky | .......... | H04L 1/1867 455/412.2 |
| 2013/0191233 A1* | 7/2013 | Atkinson | ......... | G06K 19/06018 705/21 |
| 2015/0282216 A1* | 10/2015 | Reshef | ................. | H04W 8/005 455/39 |

FOREIGN PATENT DOCUMENTS

| | | |
|---|---|---|
| CN | 102231865 A | 11/2011 |
| CN | 103002037 A | 3/2013 |
| CN | 103051780 A | 4/2013 |
| CN | 103179022 A | 6/2013 |
| CN | 103634205 A | 3/2014 |
| CN | 104144113 A | 11/2014 |
| WO | 2011/053357 A1 | 5/2011 |

OTHER PUBLICATIONS

Tencent Technology, IPRP, PCT/CN2014/091169, Oct. 18, 2016, 7 pgs.

* cited by examiner

METHOD AND SYSTEM OF OPERATING A SOCIAL NETWORKING APPLICATION VIA AN EXTERNAL DEVICE

RELATED APPLICATIONS

This application is a continuation of International Application No. PCT/CN2014/091169, entitled "Method and system of operating a social networking application via an external device" filed on Nov. 14, 2014, which claims priority to Chinese Patent Application No. 201410155958.8, entitled "Method and system of operating a social networking application via an external device" filed on Apr. 17, 2014, both of which are incorporated by reference in their entirety.

TECHNICAL FIELD

The present application relates to the field of the internet technologies, and in particular, to a method and system of operating a social networking application via an external device.

BACKGROUND

With the rapid development of the internet technologies, an increasing number of users communicate with other users using a social networking conversation, for example, an instant messaging tool or a Social Networking Service (SNS). However, it is usually inconvenient for a user to operate a social networking application installed on a social networking terminal during driving or walking, because such operation usually brings risks to the safety of the user and the security of the social networking terminal.

SUMMARY

According to some embodiments of the present application, a method of operating a social networking application via an external device comprises at an external device having one or more processors and memory storing programs executed by the one or more processors, receiving one or more new message notifications of a social networking application from a social networking terminal; acquiring a playback instruction from a user to play a new message of the social networking application on the external device; transmitting the playback instruction to the social networking terminal; receiving a first voice message corresponding to the new message of the social networking application from the social networking terminal; and playing the first voice message on the external device.

In some embodiments, the method of operating a social networking application via an external device further comprises acquiring an input instruction from the user to input a second voice message from the external device; transmitting the input instruction to the social networking terminal; recording the second voice message from the external device; and transmitting the second voice message to the social networking terminal.

In some embodiments, the method of operating a social networking application via an external device further comprises setting a social networking conversation that corresponds to the new message as a current social networking conversation; acquiring a switch instruction from the user to switch to a next new message of the social networking application; and updating the current social networking conversation to correspond to the next new message of the social networking application.

In some embodiments, the method of operating a social networking application via an external device further comprises detecting whether a user operation on the external device corresponds to the playback instruction; and if the user operation on the external device corresponds to the playback instruction, generating the playback instruction.

In some embodiments, the method of operating a social networking application via an external device further comprises detecting whether a user operation on the external device corresponds to the input instruction; and if the user operation on the external device corresponds to the input instruction, generating the input instruction.

In some embodiments, the method of operating a social networking application via an external device further comprises detecting whether a user operation on the external device corresponds to the switch instruction; and if the user operation on the external device corresponds to the switch instruction, generating the switch instruction.

In some embodiments, recording the second voice message from the external device further comprises holding a button on the external device to start recording; and releasing the button on the external device to end recording.

In some embodiments, the method of operating a social networking application via an external device further comprises requesting authentication of the external device from the social networking terminal; and establishing a connection between the external device and the social networking terminal if the authentication of the external device is granted by the social networking terminal.

According to some embodiments of the present application, a method of operating a social networking application via an external device comprises at a social networking terminal having one or more processors and memory storing programs executed by the one or more processors, receiving one or more new message of a social networking application; transmitting one or more new message notifications of the social networking application to an external device; receiving a playback instruction to play a new message of the social networking application from the external device; retrieving the new message of the social networking application from a computer server; and transmitting a first voice message corresponding to the new message of the social networking application to the external device.

In some embodiments, the method of operating a social networking application via an external device further comprises receiving an input instruction to input a second voice message from the external device; enabling a voice input function of the social networking terminal; receiving the second voice message recorded from the external device; and transmitting the second voice message to the computer server.

In some embodiments, the method of operating a social networking application via an external device further comprises detecting whether the new message of the social networking application is a text message; and if the new message of the social networking application is a text message, converting the text message into the first voice message.

In some embodiments, the method of operating a social networking application via an external device further comprises determining authentication of the external device; and establishing a connection between the external device and the social networking terminal if the authentication of the external device is granted by the social networking terminal.

In some embodiments, the method of operating a social networking application via an external device further comprises receiving a first identifier that represents the external device; scanning an image code on the external device; retrieving coded information of the external device by decoding the image code; transmitting the coded information of the external device to the computer server; receiving a second identifier that corresponds to the coded information from the computer server; determining whether the first identifier is consistent with the second identifier; and granting the authentication of the external device if the first identifier is consistent with the second identifier.

According to some embodiments of the present application, a system of operating a social networking application via an external device, comprises an external device having one or more processors and memory storing one or more programs configured for execution by the one or more processors, the one or more programs including instructions for receiving one or more new message notifications of a social networking application from a social networking terminal; acquiring a playback instruction from a user to play a new message of the social networking application on the external device; transmitting the playback instruction to the social networking terminal; receiving a first voice message corresponding to the new message of the social networking application from the social networking terminal; and playing the first voice message on the external device.

According to some embodiments of the present application, a system of operating a social networking application via an external device, comprises a social networking terminal having one or more processors and memory storing one or more programs configured for execution by the one or more processors, the one or more programs including instructions for receiving one or more new message of a social networking application; transmitting one or more new message notifications of the social networking application to an external device; receiving a playback instruction to play a new message of the social networking application from the external device; retrieving the new message of the social networking application from a computer server; and transmitting a first voice message corresponding to the new message of the social networking application to the external device.

According to some embodiments of the present application, a non-transitory computer readable storage medium, storing one or more programs for execution by one or more processors of an external device of a system of operating a social networking application via the external device includes instructions for receiving one or more new message notifications of a social networking application from a social networking terminal; acquiring a playback instruction from a user to play a new message of the social networking application on the external device; transmitting the playback instruction to the social networking terminal; receiving a first voice message corresponding to the new message of the social networking application from the social networking terminal; and playing the first voice message on the external device.

According to some embodiments of the present application, a non-transitory computer readable storage medium, storing one or more programs for execution by one or more processors of a social networking terminal of a system of operating a social networking application via the external device includes instructions for receiving one or more new message of a social networking application; transmitting one or more new message notifications of the social networking application to an external device; receiving a playback instruction to play a new message of the social networking application from the external device; retrieving the new message of the social networking application from a computer server; and transmitting a first voice message corresponding to the new message of the social networking application to the external device.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

To describe the technical solutions in the embodiments of the present application or in the prior art more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The technical solutions in the embodiments of the present application are described clearly and completely with reference to the accompanying drawings in the embodiments of the present application in the following. As should be apparent, the described embodiments are merely a part rather than all of the embodiments of the present application. All other embodiments obtained by a person of ordinary skill in the art based on the embodiments of the present application without creative efforts fall within the protection scope of the present application.

According to some embodiments of the present application, a social networking terminal may communicate with a server or another social networking terminal using a computer server. The social networking terminal may be a social networking application client, or a network terminal on which the social networking application is installed. The social networking application client may be, an instant social networking terminal, an SNS client, a game client, or a mail client. In addition, the network terminal may be an intelligent device having a networking function, such as a tablet computer, a mobile phone, an electronic reader, a personal computer (PC), a notebook computer, a vehicle-mounted device, or a web TV. The external device according to some embodiments of the present application may be a control device capable of communicating with the social networking terminal, where the external device may be an independent control device, or integrated in a headset, a microphone, a wearable device, a mobile phone, an electronic reader, or a remote control.

Figure 1:
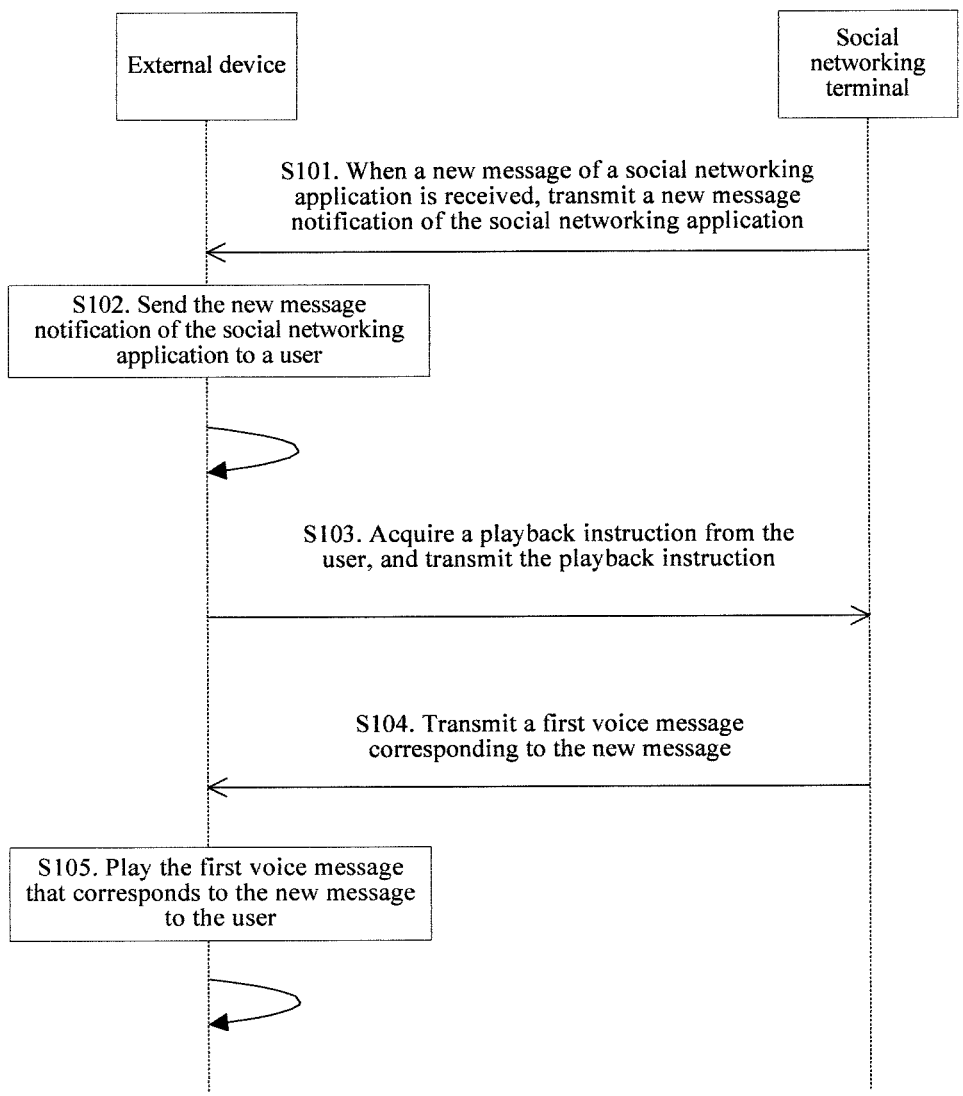
FIG. 1 is a schematic flowchart of a method for operating a social networking application via an external device according to an embodiment of the present application.

FIG. 1 is a schematic flowchart of a method for operating a social networking application via an external device according to an embodiment of the present application. The method for operating a social networking application via an external device in this embodiment may include the steps discussed below.

At step S101, when a new social networking message is received, the social networking terminal sends the new message notification to an external device.

The social networking message may include text messages, voice messages, or video messages, etc.

In some embodiments, the social networking terminal may connect to the external device using a wireless communication technologies, such as Bluetooth or Near Field Communication (NFC). In some embodiments, the social networking terminal may connect to the external device using a wired connection, such as a Universal Serial Bus (USB) or 3.5-mm audio port. When receiving a new social networking message, the social networking terminal may generate a new message notification and send the new message notification to the external device through the established connection. The new message notification may be a voice notification, such as "you've received a new message." Further, the new message notification may include detailed data, for example, information about a sender of the received new message, a synopsis of the message, etc.

At step S102, the external device sends a social networking message notification to a user.

In some embodiments, the social networking message notification may be a voice notification generated by the social networking terminal according to the social networking message.

In some embodiments, the external device may notify the user of different new messages using various notification schemes. In some embodiments, the external device may set LED lights in different colors, or set different notification mechanisms to indicate different social networking applications. For example, when the social networking terminal receives a new message, the external device may notify the user by blinking an LED light. Yet in another example, when the social networking terminal enables a voice input function, the external device may turn on the LED light indicate that the social networking terminal is in a voice input status; and when the voice input is ended and the voice input function is disabled, the external device may turn off the LED light to indicate that the voice input status is ended. In some embodiments, when a sound output module such as a headset, a power amplifier, or a stereo is integrated in the external device, the external device may also notify the user using a voice message corresponding to the social networking message. For example, when the social networking terminal receives a new message, the sound output module may output a voice message notifying "you've received a new message." Further, the notification voice message may also include detailed data, for example, the sound output module may output a voice message notifying "you've received a voice message from XX; to play it, please press the voice playback key."

At step S103, the external device acquires a playback instruction from the user, and sends the playback instruction to the social networking terminal.

In some embodiments, one or more physical keys or virtual keys may be disposed on the external device, so as to enable the user to control operations of the device. The user may tap, double-tap, or touch and hold on the physical key or the virtual key to generate instructions. The external device may be pre-configured with a plurality of instructions that correspond to different control operations. When a control operation is input by the user, the external device may acquire a corresponding control instruction, and send the instruction to the social networking terminal. The control instruction may include a message playback instruction, a session switch instruction, a message input instruction, a message sending instruction, or the like, and the corresponding control information may include message playback information, session switch information, message input information, message sending information, or the like. For example, after the external device sends the social networking message notification to the user, the user taps a physical control key disposed on the external device, and generates a message playback instruction. The message playback instruction is further sent from the external device to the social networking terminal. Further, the control information may include a preset instruction identifier CmdId. The external device may set a pre-agreement with the social networking terminal for a social networking control instruction corresponding to the CmdId. For example, the external device may send a Bluetooth data packet to the social networking terminal, where the Bluetooth data packet carries a CmdId of the message playback information.

At step S104, the social networking terminal sends a first voice message corresponding to the newly received social networking message to the external device upon receiving the playback instruction.

In some embodiments when the new social networking message is a text message, the social networking terminal may convert the text message into a voice message, and transmit the converted voice message to the external device.

In some embodiments, after receiving a Bluetooth data packet sent by the external device, the social networking terminal may execute the playback instruction based on the CmdId carried in the Bluetooth data packet.

At step S105, the external device plays the first voice message that corresponds to the newly received social networking message to the user.

According to the present application, when a new social networking message is received, the social networking terminal may notify the user by sending a notification message to the external device. Further, upon receiving the notification, the user may respond by operating the external device to send instructions such as message playback, session switch, voice input, etc., to the social networking terminal. The social networking terminal may further transmit the received new message, switch to the next new message, or record the user input according to respective instructions. The present application provides an instant and convenient service to the user so that the user can access the social networking application status during driving or walking.

Figure 2:
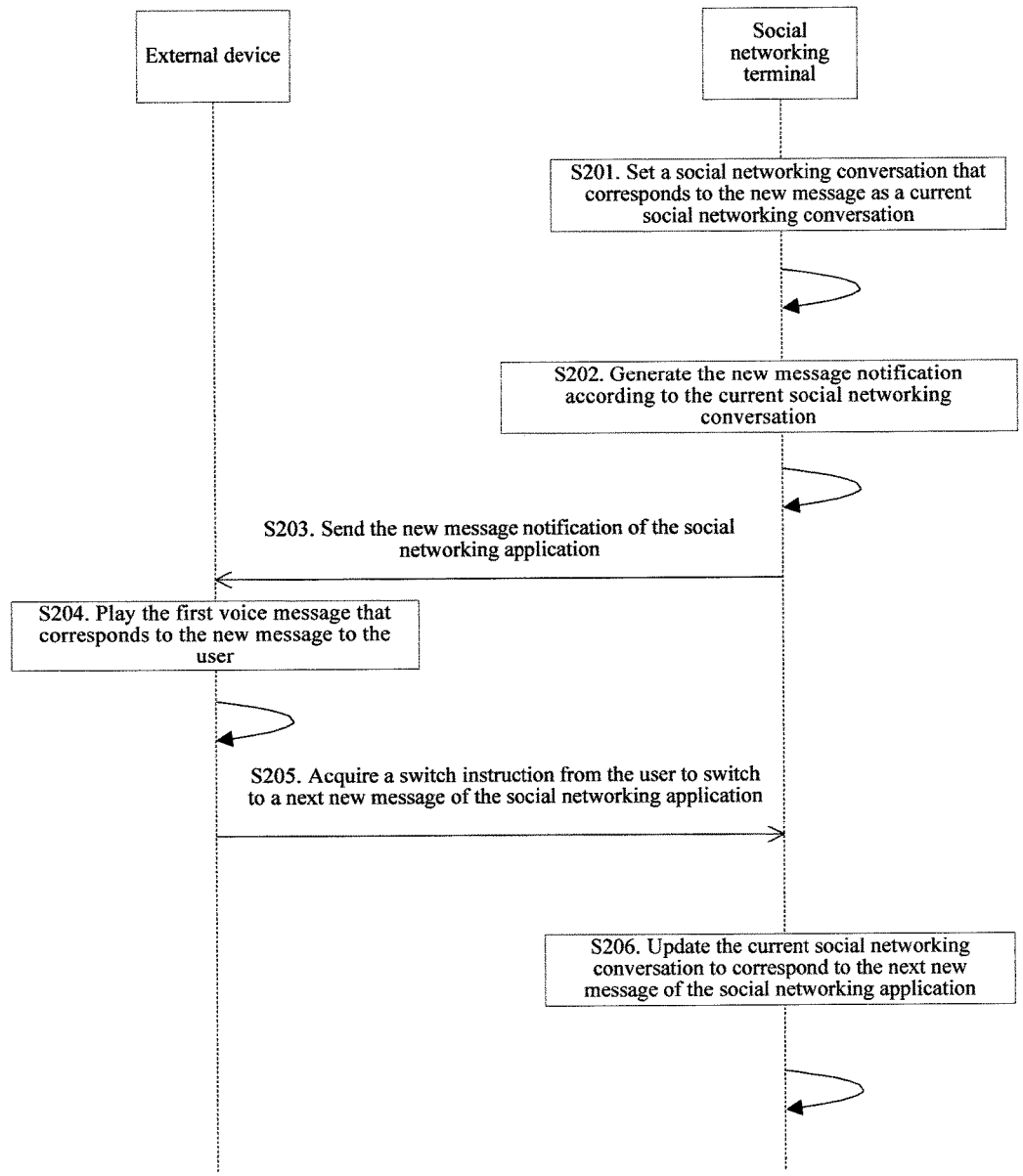
FIG. 2 is a schematic flowchart of a method for operating a social networking application via an external device according to another embodiment of the present application.

FIG. 2 is a schematic flowchart of a method for operating a social networking application via an external device according to another embodiment of the present application. The method for operating a social networking application via an external device in this embodiment may include steps discussed below.

At step S201, a social networking conversation that corresponds to the new message is set as a current social networking conversation.

At step S202, the new message notification is generated according to the current social networking conversation.

In some embodiments, the social networking terminal may generate a voice notification in accordance with the received new message and the social networking application. For example, if a new message is received from user Kay of the social networking application, the voice notification may be generated as "you've received a message from Kay."

At step S203, the new message notification of the social networking application is sent from the social networking terminal to the external device.

At step S204, the external device plays the message notify voice information to a user.

After receiving the message notification sent by the social networking terminal, the external device may play the voice message to a user, for example, play "you've received two messages from Kay," so as to inform the user that the social networking terminal receives two pieces of social networking information from Kay in a social networking application session.

At step S205, a switch instruction is acquired from the user to switch to a next new message of the social networking application.

After the external device sends the social networking message notification to the user, the external device may acquire a switch instruction inputted by the user using a physical control key disposed on the external device, and send the switch instruction to the social networking terminal.

At step S206, the current social networking conversation is updated to correspond to the next new message of the social networking application.

In some embodiments, the user may double-click a button disposed on the external device to generate a switch instruction. After the external device sends a Bluetooth data packet to the social networking terminal, where the Bluetooth data packet carries a CmdId of the session switch information, the social networking terminal executes the switch instruction to switch to the next new message, and update the current social networking conversation to the next new message.

According to the present application, when a new social networking message is received, the social networking terminal may set a social networking conversation that corresponds to the new message as a current social networking conversation. Further, when an instruction to switch to the next new message is received from the external device, the social networking terminal may transmit the voice notification corresponding to the next new message to the external device, and update the current social networking conversation to correspond to the next new message of the social networking application. The present application provides an instant and convenient service to the user so that the user can have real update of the social networking application status during driving or walking.

Figure 3:
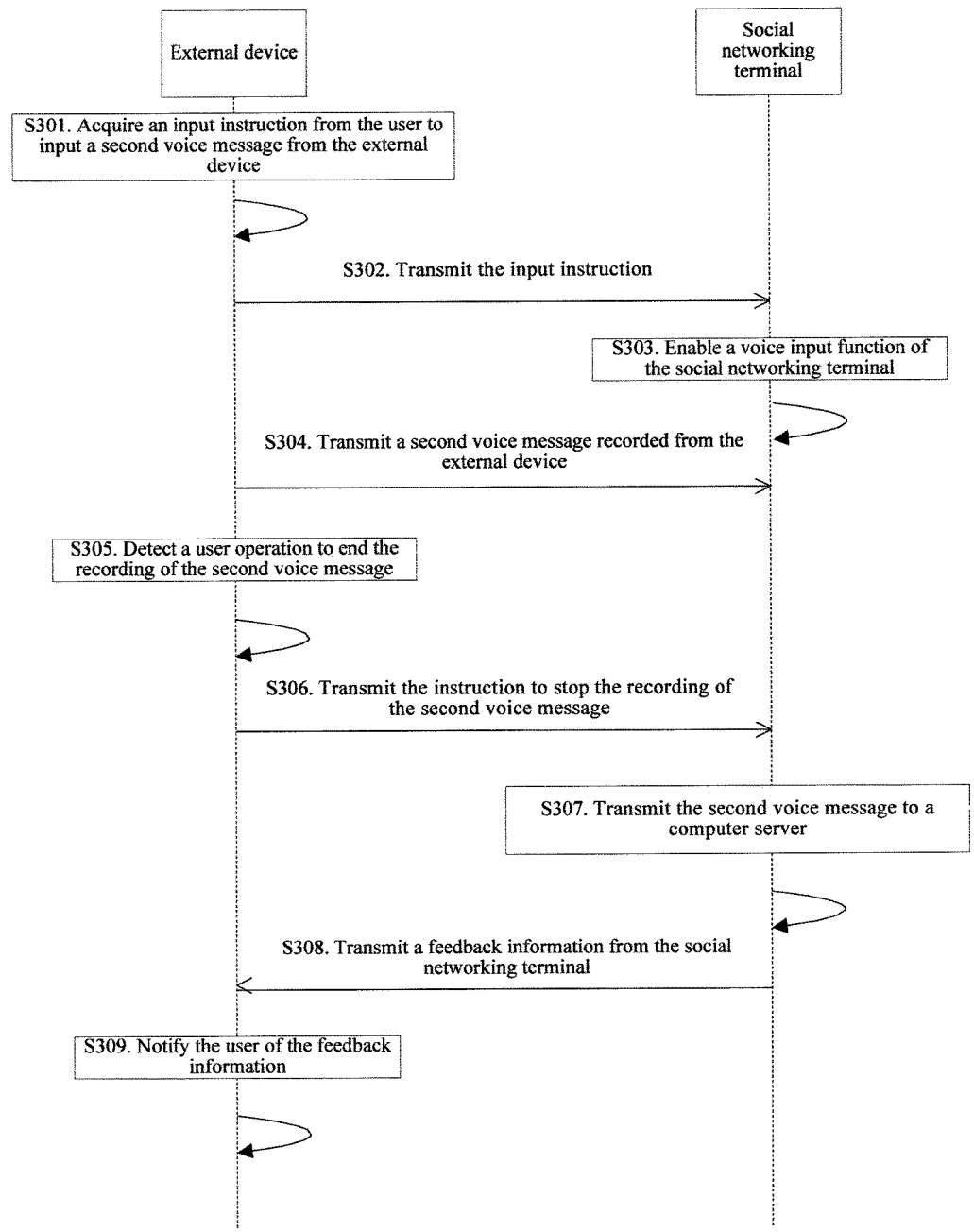
FIG. 3 is a schematic flowchart of a method for operating a social networking application via an external device according to another embodiment of the present application.

FIG. 3 is a schematic flowchart of a method for operating a social networking application via an external device according to another embodiment of the present application. The method for operating a social networking application via an external device in this embodiment may include the steps discussed below.

At step S301, an input instruction is acquired from the user to input a second voice message from the external device.

At step S302, the input instruction is transmitted to the social networking terminal.

In some embodiments, the user may hold a button on the external device to generate an input instruction. Further, a Bluetooth data packet carrying a CmdId for information input instruction is transmitted from the external device to the social networking terminal.

At step S303, a voice input function of the social networking terminal is enabled.

At step S304, a second voice message recorded is transmitted from the external device to the social networking terminal.

In some embodiments, the button on the external device may be held through the voice message input.

At step S305, a user operation to end the recording of the second voice message is detected.

In some embodiments, when the user releases the button the external device, an instruction to end the voice recording may be generated, and sent to the social networking terminal.

In some embodiments, the external device may turn on an LED light to indicate voice input in status, and turn off the LED light to indicate the voice input ends.

At step S306, the instruction to stop the recording of the second voice message is transmitted from the external device to the social networking terminal.

At step S307, the second voice message is transmitted to a computer server.

At step S308, feedback information is transmitted from the social networking terminal.

In some embodiment, after the recorded voice message, i.e., the second voice message is transmitted to the computer server, the social networking terminal may send feedback information to notify the external device as to whether the recorded voice message is successfully transmitted.

In some embodiments, the social networking terminal may pre-set a plurality of status information that correspond to the various social networking application status. The plurality of status information may include the CmdId identifier, which is carried in the Bluetooth data packet transmitted from the social networking terminal to the external device. Further, when the social networking terminal detects a status change of the social networking application, such as message sent success/failure, new message received, terminal login status (e.g., online/offline notification), status information may be sent to the external device to reflect such status change.

At step S309, the user is notified of the feedback information.

In some embodiments, the external device may notify the user whether the message is successfully sent after receiving the feedback information from the social networking terminal. For example, the external device may blink the LED light to notify the user of a successful transmission of a voice message. When a sound output module such as a headset, a power amplifier, or a stereo is integrated in the external device, the external device may output a voice notification such as "hush" to inform the user that the voice information is successfully sent to the social networking terminal.

According to the present application, an input instruction may be generated by the user through holding a button on the external device. Further, a voice input function of the social networking terminal may be enabled, and a second voice message recorded may be transmitted from the external device to the social networking terminal. When the external device detects that the user releases the button, the external device may send the instruction to stop the recording of the second voice message to the social networking terminal. Further, the external device may receive a feedback information from the social networking terminal as to whether the second voice message is successfully transmitted, and notify the user about the feedback information. The present application provides an instant and convenient service to a social networking application user to record and input a voice message via the external device during driving or walking.

Figure 4:
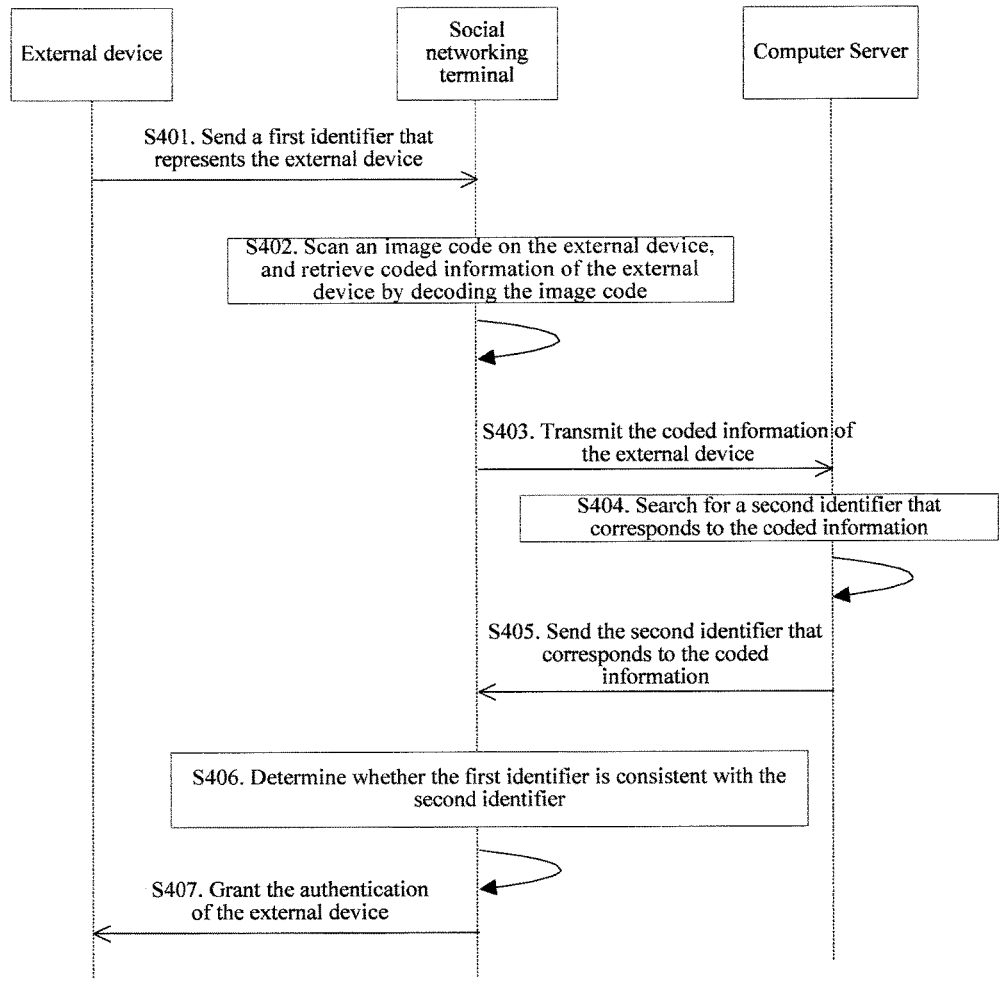
FIG. 4 is a schematic flowchart of a method for operating a social networking application via an external device according to another embodiment of the present application.

FIG. 4 is a schematic flowchart of a method for operating a social networking application via an external device according to another embodiment of the present application. The method for operating a social networking application via an external device in this embodiment may include the steps discussed below.

At step S401, a first identifier that represents the external device is sent to the social networking terminal.

At step S402, an image code on the external device is scanned at the social networking terminal, and coded information of the external device is retrieved by decoding the image code.

In some embodiments, the image code may include, but is not limited to, a two-dimensional code and a three-dimensional code, and may be pre-printed on a surface or a product package of the external device. In some embodiments, the image code may be displayed on the external device if the external device is configured with displaying function.

In some embodiments, the coded information of the external device may be character information that is pre-configured by the social networking terminal for the external device.

At step S403, the coded information of the external device is transmitted to a computer server.

At step S404, the computer server searches for a second identifier that corresponds to the coded information.

In some embodiments, the computer server may be a social networking application server, or an external device management server.

At step S405, the second identifier that corresponds to the coded information is sent to the social networking terminal.

At step S406, the social networking terminal determines whether the first identifier is consistent with the second identifier.

In some embodiments, the social networking terminal may only send new message notification to an external device after the external device is confirmed to be a secure device. If it is determined that the external device is not a secure or legitimate device, the social networking terminal may return an error code to the external device, and will not forward any new message notifications.

At step S407, if the first identifier is consistent with the second identifier, the social networking terminal grants the authentication of the external device.

According to the present application, if the first identifier is consistent with the second identifier, the social networking terminal grants the authentication of the external device, and the social networking terminal may forward the new message notification to the granted external device. Yet in some other embodiments, if the first identifier is not consistent with the second identifier, the social networking terminal may not forward the new message notification to the granted external device; however, the user may operate the social networking application via the external device except that no new message is forwarded to the external device. Therefore, the present application can provide a secure and efficient control of the social networking application from an external device.

Figure 5:
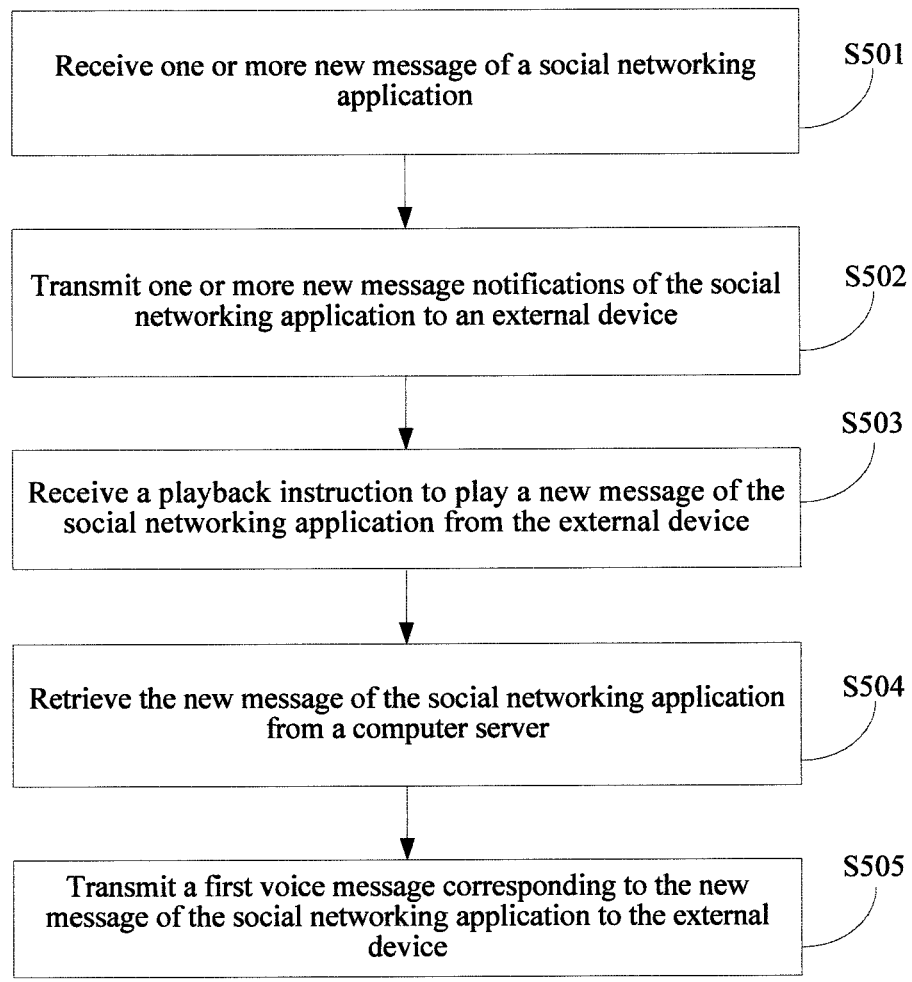
FIG. 5 is a schematic flowchart of a method for operating a social networking application via an external device according to another embodiment of the present application.

FIG. 5 is a schematic flowchart of a method for operating a social networking application via an external device according to another embodiment of the present application. The method for operating a social networking application via an external device in this embodiment may include the steps discussed below.

At step S501, one or more new message of a social networking application are received at a social networking terminal.

At step S502, one or more new message notifications of the social networking application are transmitted to an external device.

In some embodiments, the one or more new messages are voice messages, and therefore, may be transmitted directly to the external device. Yet in some other embodiments, the one or more new messages are text messages, and the social networking terminal may convert the text messages into voice messages before transmitting.

At step S503, a playback instruction to play a new message of the social networking application is received from the external device.

In some embodiments, user instructions may be generated by clicking, double-clicking, clicking and holding some preset buttons on the external device. The corresponding relationship between a user instruction and a user operation on the external device may be pre-configured on the external device. In some embodiments, a playback instruction may be generated by clicking a button on the external device; a switch instruction may be generated by double-clicking a button on the external device; and an input instruction may be generated by clicking and holding a button on the external device.

At step S504, the new message of the social networking application is received from a computer server.

In some embodiments, upon receiving a playback instruction from the user, the social networking terminal may retrieve the new message from the computer server, and forward the new message in a voice format to the external device.

At step S505, a first voice message corresponding to the new message of the social networking application is transmitted to the external device.

Figure 6:
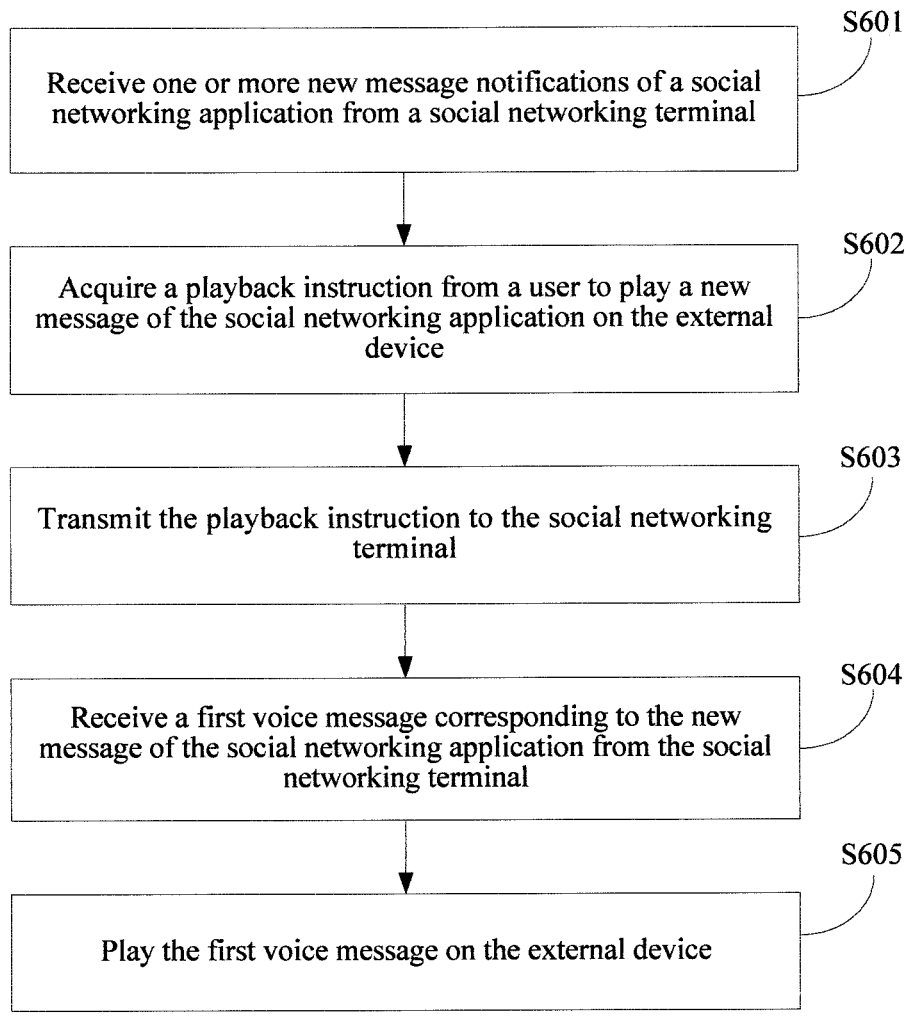
FIG. 6 is a schematic flowchart of a method for operating a social networking application via an external device according to another embodiment of the present application.

FIG. 6 is a schematic flowchart of a method for operating a social networking application via an external device according to another embodiment of the present application. The method for operating a social networking application via an external device in this embodiment may include the steps discussed below.

At step S601, one or more new message notifications of a social networking application are received from a social networking terminal.

At step S602, a playback instruction is acquired from a user to play a new message of the social networking application on the external device.

At step S603, the playback instruction is transmitted to the social networking terminal.

At step S604, a first voice message corresponding to the new message of the social networking application is received from the social networking terminal.

At step S605, the first voice message is played on the external device.

Figure 7:
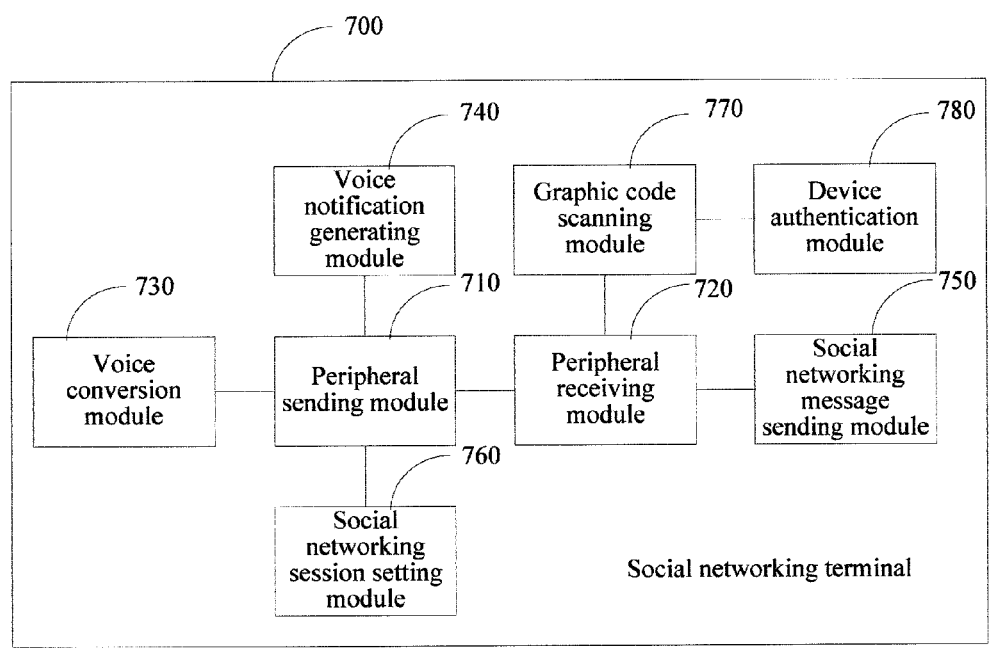
FIG. 7 is a schematic structural diagram of a social networking terminal according to an embodiment of the present application.

FIG. 7 is a schematic structural diagram of a social networking terminal 700 according to an embodiment of the present application. According to some embodiments of the present application, a social networking terminal 700 may communicate with a server or another social networking terminal using a computer server. The social networking terminal 700 may be a social networking application client, or a network terminal on which the social networking application is installed. The social networking application client may be, an instant social networking terminal, an SNS client, a game client, or a mail client. In addition, the network terminal may be an intelligent device having a networking function, such as a tablet computer, a mobile phone, an electronic reader, a personal computer (PC), a notebook computer, a vehicle-mounted device, or a web TV. The external device according to some embodiments of the present application may be a control device capable of communicating with the social networking terminal, where the external device may be, for example, an independent control device, or integrated in a headset, a microphone, a wearable device, a mobile phone, an electronic reader, or a remote control.

The social networking terminal 700 in the embodiment of the present application may include the modules discussed below.

A peripheral sending module 710 may be configured to transmit new message notifications to an external device when new messages of a social networking application are received at the social networking terminal.

In some embodiments, the peripheral sending module 710 may connect to the external device using a wireless connection, such as Bluetooth or NFC. In some embodiments, the social networking terminal may connect to the external device using a wired connection such as a USB or 3.5-mm audio port.

A peripheral receiving module 720 may be configured to receive user instructions inputted from the external device, for example, a playback instruction from a user to play a new message of the social networking application on the external device, an input instruction from the user to input a second voice message from the external device, a switch instruction from the user to switch to a next new message of the social networking application, etc.

In some embodiments, the social networking terminal 700 may further include a voice conversion module 730 configured to convert the text message content into a voice message if the newly received message is a text message.

In some embodiments, the social networking terminal 700 may further include a voice notification generating module 740 configured to generate a message notification corresponding to the newly received social networking message.

In some embodiments, the social networking terminal 700 may further include a social networking message sending module 750 configured to receive an input instruction to input a second voice message from the external device; enable a voice input function of the social networking terminal; receive the second voice message recorded from the external device; and transmit the second voice message to the computer server.

In some embodiments, the social networking terminal 700 may further include a social networking session setting module 760 configured to set a social networking conversation that corresponds to the new message as a current social networking conversation; acquire a switch instruction from the user to switch to a next new message of the social networking application; and update the current social networking conversation to correspond to the next new message of the social networking application.

In some embodiments, after the social networking message sending module 750 transmits the recorded voice message from the external device to a server, the peripheral sending module 710 may further send feedback information to the external server as to whether the recorded voice message is successfully transmitted to the server.

In some embodiments, the peripheral receiving module 720 may be further configured to receive a first identifier that represents the external device.

A graphic code scanning module 770 may be configured to scan an image code on the external device; retrieve coded information of the external device by decoding the image code, and send the coded information to a server so that the server can search for a second identifier that corresponds to the coded information. In some embodiments, the coded information is character information pre-generated for the external device by the server.

A device authentication module 780 may be configured to receive the second identifier that corresponds to the coded information; determine whether the first identifier is consistent with the second identifier; and grant the authentication of the external device if the first identifier is consistent with the second identifier.

Figure 8:
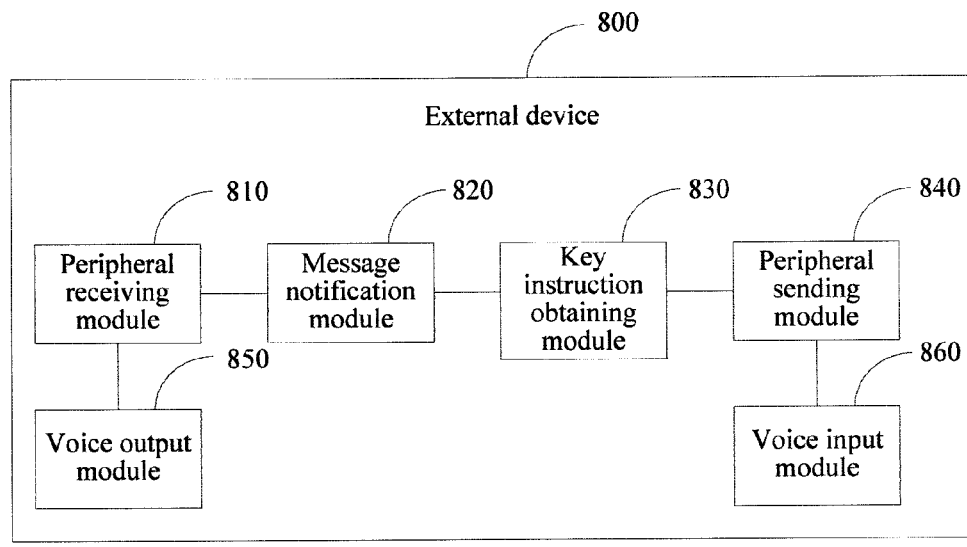
FIG. 8 is a schematic structural diagram of an external device according to an embodiment of the present application.

FIG. 8 is a schematic structural diagram of an external device 800 according to an embodiment of the present application. In some embodiments of the present application, the external device 800 may be an independent control device that can communication with the social networking terminal, or may be integrated in a communication device, such as a headset, a microphone, a wearable device, a cell phone, a electric reader, a remote controller, etc. As shown in FIG. 8, the external device 800 in the embodiment of the present application may include the modules discussed below.

A peripheral receiving module 810 may be configured to receive one or more new message notifications of a social networking application from a social networking terminal.

A message notification module 820 may be configured to send a social networking message notification to a user according to the social networking message notify information. When the peripheral receiving module 810 receives a voice message corresponding to the newly received social networking message, the message notification module 820 may notify the user by playing the voice message on the external device.

In some embodiments, the message notification module 820 may set the LED light in different colors to indicate different social networking application status. For example, the LED light may be set as blinking when a new message is received, in on status when a voice message is inputting from the external device, or in off status when the voice message inputting ends. In some embodiments, when a sound output module, such as a headset, a power amplifier, or a stereo is integrated in the external device 800, the message notification module 820 may use a voice message to notify the user. For example, when the social networking terminal receives a new message, the message notification module 820 outputs a voice message notifying "you've received a new message." Further, the voice message may include detailed information such as the sender's information and a brief description of the message, and the user may be notified as "you've received a voice message from XX; to play it, please press the voice playback key."

A key instruction obtaining module 830 may be configured to acquire user instructions such as a playback instruction from a user to play a new message of the social networking application on the external device, an input instruction from the user to input a second voice message from the external device, a switch instruction from the user to switch to a next new message of the social networking application, etc.

In some embodiments, the external device may be configured with one or more buttons. When the user operates the buttons, the external device may acquire user instructions that corresponds to the particular user operation. The user operation pattern may include clicking, double-clicking, clicking and holding, etc. In some embodiments, the pattern of clicking may generate a playback instruction, the pattern of double-clicking may generate a switch instruction, and the pattern of clicking and holding may generate an input instruction.

A peripheral sending module 840 may be configured to send the user instructions to the social networking terminal. In some embodiments, the peripheral sending module 840 may send control information to the social networking terminal according to a control instruction, where the control information may include message playback information, session switch information, message input information, message sending information, or the like. Further, the control information may include a preset instruction identifier CmdId, which may be pre-agreed between the external device and the social networking terminal.

The peripheral receiving module 810 may be further configured to receive voice message corresponding the newly received message of the social networking application sent from the social networking terminal.

A voice output module 850 may be configured to play the voice message to the user.

In some embodiments, the social networking message notification information may include a voice message generated by the social networking terminal according to the social networking message.

Further, the message notification module 820 may be configured to trigger the voice output module 850 to play the voice message to the user.

In some embodiments, the key instruction obtaining module 830 may be further configured to acquire a message input instruction.

The peripheral sending module 840 may be further configured to send message input instruction to the social networking terminal.

In some embodiments, the external device 800 may further include a voice input module 860 configured to obtain voice information input by the user.

Further, that the peripheral sending module 840 sends message input information to the social networking terminal according to the message input instruction. In some embodiments, the peripheral sending module 840 sends message input information to the social networking terminal, so that the social networking terminal enables a voice input function according to the message input information, and at the same time, the peripheral sending module 840 sends voice information, which is input by the user, to the social networking terminal.

According to the present application, the peripheral receiving module 810 may receive a new social networking application message from the social networking terminal, the message notification module 820 may notify the user, the key instruction obtaining module 830 may acquire user instruction from the button on the external device, the peripheral sending module 840 may send the user instructions to the social networking terminal, the peripheral receiving module 810 may further receive the voice message from the social networking terminal, and the voice output module 850 may play the voice message on the external device to the user.

Figure 9:
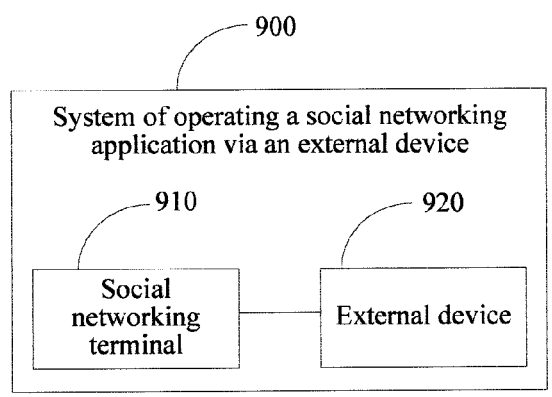
FIG. 9 is a schematic structural diagram of a system for operating a social networking application via an external device according to an embodiment of the present application.

FIG. 9 is a schematic structural diagram of a system 900 for operating a social networking application via an external device according to an embodiment of the present application. The system 900 for operating a social networking application via an external device may include at least a social networking terminal 910 and an external device 920.

The social networking terminal 910 may be configured to send social networking message notification information to the external device 920 when receiving a new social networking message.

The external device 920 may be configured to send a social networking message notification to a user according to the social networking message notify information.

In some embodiments, the external device 920 may provide with at least one physical key. Further, the external device 920 may be further configured to obtain a message playback instruction, which is input by the user using the physical key disposed on the external device 920, and send message playback information to the social networking terminal 910 according to the message playback instruction.

The social networking terminal 910 may be further configured to send voice information of the social networking message to the external device 920 according to the message playback information.

The external device 920 may be further configured to play the voice information of the social networking message to the user.

In some embodiments, the social networking message notification information sent by the social networking terminal 910 may be a voice message.

In some embodiments, the external device 920 may also obtain a message input instruction, which is input by the user using a physical key disposed on the external device 920, and send message input information to the social networking terminal 910 according to the message input instruction.

Further, the social networking terminal 910 may obtain a social networking message, which is input by the user using the external device 920, according to the message input information, and submits the social networking message to a server for a current social networking session.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are In some embodiments mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of operating a social networking application via a peripheral device, comprising:
   at a social networking terminal having one or more processors and memory storing programs executed by the one or more processors,
   authenticating the peripheral device, including:
      receiving a first identifier that represents the peripheral device;
      scanning an image code on the peripheral device, wherein the image code is preprinted on a surface of the peripheral device;
      retrieving coded information of the peripheral device by decoding the image code;
      transmitting the coded information of the peripheral device to a computer server;
      receiving a second identifier that corresponds to the coded information from the computer server;
      determining whether the first identifier is consistent with the second identifier; and
      granting the authentication of the peripheral device if the first identifier is consistent with the second identifier;
   after the authentication:
      receiving one or more new messages of a social networking application;
      transmitting one or more new message notifications of the social networking application to the peripheral device;
      receiving a playback instruction to play a new message of the social networking application from the peripheral device;
      retrieving the new message of the social networking application from the computer server; and
      transmitting a first voice message corresponding to the new message of the social networking application to the peripheral device.

2. The method of claim 1, further comprising:
   receiving an input instruction to input a second voice message from the peripheral device;
   enabling a voice input function of the social networking terminal;
   receiving the second voice message recorded from the peripheral device; and
   transmitting the second voice message to the computer server.

3. The method of claim 1, further comprising:
   detecting whether the new message of the social networking application is a text message; and
   if the new message of the social networking application is a text message, converting the text message into the first voice message.

4. The method of claim 1, further comprising:
   determining authentication of the peripheral device; and
   establishing a connection between the peripheral device and the social networking terminal if the authentication of the peripheral device is granted by the social networking terminal.

5. A social networking terminal for operating a social networking application via a peripheral device, the social networking terminal having one or more processors and memory storing one or more programs configured for execution by the one or more processors, the one or more programs including instructions for:
   authenticating the peripheral device, including:
      receiving a first identifier that represents the peripheral device;
      scanning an image code on the peripheral device, wherein the image code is preprinted on a surface of the peripheral device
      retrieving coded information of the peripheral device by decoding the image code;
      transmitting the coded information of the peripheral device to a computer server;

receiving a second identifier that corresponds to the coded information from the computer server;

determining whether the first identifier is consistent with the second identifier; and granting the authentication of the peripheral device if the first identifier is consistent with the second identifier;

after the authentication:

receiving one or more new message of a social networking application;

transmitting one or more new message notifications of the social networking application to the peripheral device;

receiving a playback instruction to play a new message of the social networking application from the peripheral device;

retrieving the new message of the social networking application from the computer server; and transmitting a first voice message corresponding to the new message of the social networking application to the peripheral device.

6. A non-transitory computer readable storage medium, storing one or more programs for execution by one or more processors of a social networking terminal for operating a social networking application via a peripheral device, the one or more programs including instructions for:

authenticating the peripheral device, including:

receiving a first identifier that represents the peripheral device;

scanning an image code on the peripheral device, wherein the image code is preprinted on a surface of the peripheral device;

retrieving coded information of the peripheral device by decoding the image code;

transmitting the coded information of the peripheral device to a computer server;

receiving a second identifier that corresponds to the coded information from the computer server;

determining whether the first identifier is consistent with the second identifier; and granting the authentication of the peripheral device if the first identifier is consistent with the second identifier;

after the authentication:

receiving one or more new message of a social networking application;

transmitting one or more new message notifications of the social networking application to the peripheral device;

receiving a playback instruction to play a new message of the social networking application from the peripheral device;

retrieving the new message of the social networking application from the computer server; and transmitting a first voice message corresponding to the new message of the social networking application to the peripheral device.

7. The non-transitory computer readable storage medium of claim 6, wherein the one or more programs further include instructions for:

receiving an input instruction to input a second voice message from the peripheral device;

enabling a voice input function of the social networking terminal;

receiving the second voice message recorded from the peripheral device; and transmitting the second voice message to the computer server.

\* \* \* \* \*